March 7, 1967 J. A. RAJCHMAN 3,308,446

FERRITE SHEET MEMORY WITH READ AND WRITE BY ANGULAR DEFLECTION OF FLUX LOOPS

Filed Oct. 4, 1962

INVENTOR.
JAN A. RAJCHMAN
BY
[signature]
ATTORNEY

United States Patent Office 3,308,446
Patented Mar. 7, 1967

3,308,446

FERRITE SHEET MEMORY WITH READ AND WRITE BY ANGULAR DEFLECTION OF FLUX LOOPS

Jan A. Rajchman, Princeton, N.J., assignor to Radio Corporation of America, a corporation of Delaware

Filed Oct. 4, 1962, Ser. No. 228,432
4 Claims. (Cl. 340—174)

This invention relates to memories of the type including lines (winding conductors) imbedded in a sheet of magnetic material such as ferrite.

It is a general object of the invention to provide a memory adapted to low-cost production by automated techniques and capable of high speed operation by virtue of having memory elements of very small physical size.

According to an example of the invention, there is provided a sheet of magnetic material such as ferrite in which are imbedded a plurality of parallel word lines lying in a first plane and a plurality of parallel digit-sense lines at right angles to the word lines and lying in a second closely spaced parallel plane. A plurality of word drivers are each coupled to supply sequential read and write pulses of opposite polarities to respective ones of the word lines. A plurality of digit drivers are coupled to supply digit pulses to respective digit lines, simultaneously with the application of a write pulse to a word line, in accordance with the digits of a word to be stored in the memory. Sense amplifiers also coupled to the digit-sense lines provide outputs corresponding to the digits of a word stored in the memory when a read pulse is applied to the corresponding word line. The amplitudes of the read and write pulses are made sufficiently high to cause regions of flux saturation around a corresponding word line. The amplitude of a digit pulse is made to be of insufficient amplitude to cause a significant switching of the already-saturated flux (due to a read pulse) at a crossover of a digit line and an unenergized word line. However, the digit pulse is operative to affect the resultant angular direction of the flux switched in the region of the crossover of a digit line and a word line simultaneously energized by a write pulse. A following read pulse on the word line causes the inducing of sensed digit information signals on the digit-sense lines.

Figure 1:
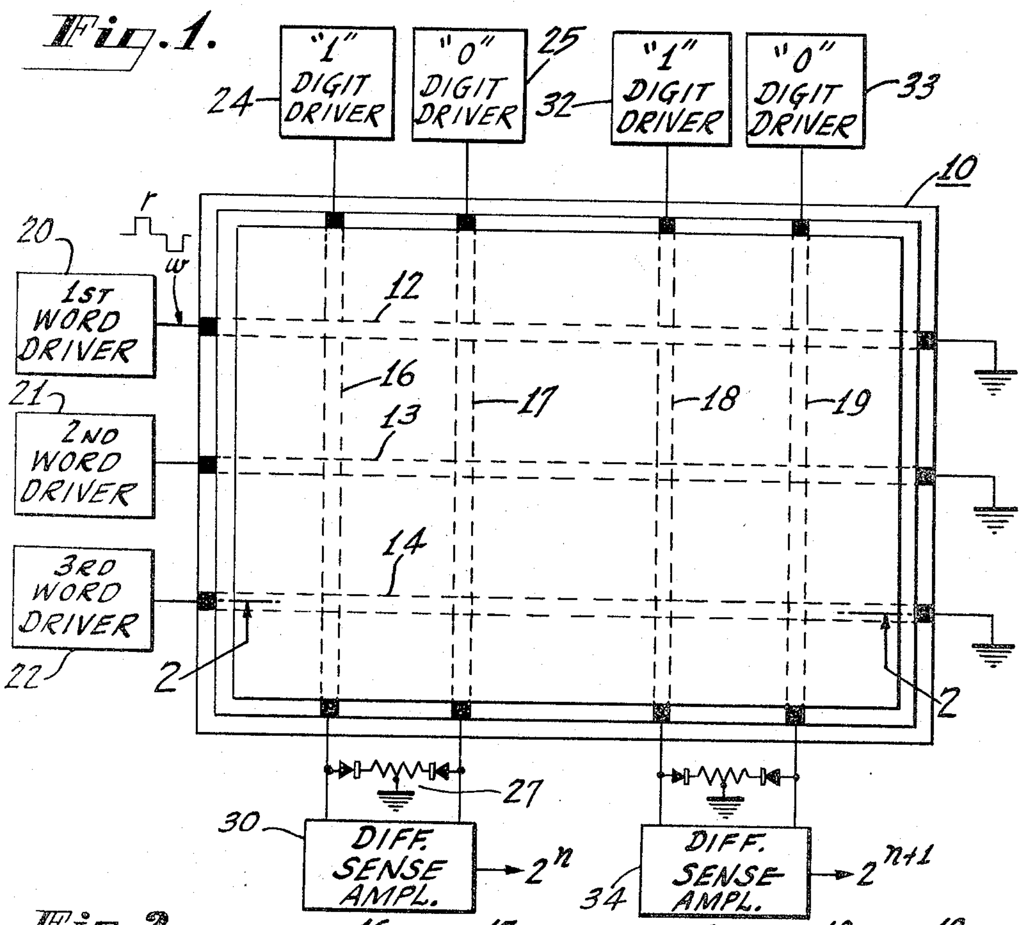
FIGURE 1 is a diagrammatic view of a memory constructed according to the teachings of the invention.
Figure 2:
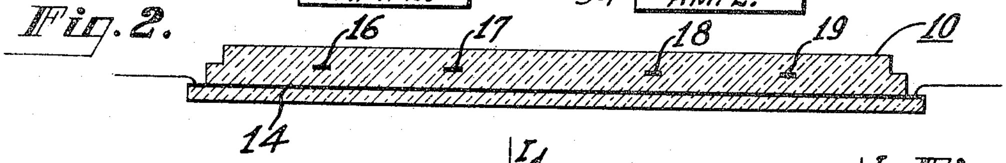
FIGURE 2 is a sectional view taken along the line 2—2 in FIGURE 1.

Referring now in greater detail to the drawing, the memory shown in FIGURES 1 and 2 includes a unitary homogeneous sheet 10 of a non-anisotropic magnetic material such as ferrite. The magnetic sheet 10 has a plurality of parallel word lines 12, 13, 14 imbedded therein in a first plane and has a plurality of digit-sense lines 16, 17, 18, 19 imbedded at right angles to the word lines in a second closely spaced parallel plane.

The magnetic sheet 10 with imbedded conductors may be constructed by doctor blading a green ferrite slurry on a flat support to thicknesses in the order of from one-half milli-inch to five milli-inches. After the doctor bladed slurry has dried, it is peeled from the support in a leather-like form. The word lines 12, 13, 14 are printed on one green ferrite sheet and the digit-sense lines are printed on another green ferrite sheet. The sheets, together with a third unprinted sheet, are then assembled into a sandwich by the application of heat and pressure. Thereafter, the sandwich is fired at a temperature such as 1200 degrees C. to sinter the green ferrite sandwich and form a unitary homogeneous magnetic ferrite sheet of rectangular hysteresis characteristics and having imbedded conductors.

The spacing between the plane of the word lines and the plane of the digit-sense lines is determined by the thickness of the intermediate green ferrite sheet of the sandwich and this spacing should preferably be as small as possible. A spacing of one-half milli-inch is not difficult of attainment and is effective. The outer green ferrite sheets may have a thickness of two or three milli-inches. Increasing the thickness increases the sense voltage but also undesirably increases the induced back voltage. The imbedded conductors may have a width of one milli-inch and a thickness of one-half milli-inch. Parallel conductors in a given plane may have a center-to-center spacing of as little as five milli-inches.

FIGURE 1 shows circuits coupled to the word lines and digit-sense lines of the magnetic sheet 10 for operation as a word-organized, two-core-per-bit memory having three words of two bits per word. First, second and third word drivers 20, 21, 22 are coupled respectively to word lines 12, 13, 14. Digit-sense lines 16, 17 are arranged as a pair with a "1" digit driver 24 coupled to digit-sense line 16 and a "0" digit driver 25 coupled to digit-sense line 17. The digit-sense lines 16, 17 are coupled across a network 27 to the two inputs of a differential sense amplifier 30 having a $2^n$ digit output. Digit drivers 32, 33 and differential sense amplifier 34 are similarly coupled to the digit-sense line pair 18, 19. FIGURE 1 is merely illustrative of a memory having provision for the storage of a much larger number of words (such as 512 or 1024) each having a much larger number of bits (such as 48 or 64).

Memory elements are constituted by the magnetic material surrounding each crossover of a word line and a digit-sense line. FIGURE 1 shows two memory elements ("cores") used for the storage of each information bit in a known arrangement providing noise cancellation. For example, the magnetic materials surrounding the crossovers of the word line 12 with the digit-sense line pair 16, 17 are used for the storage of one information bit of the first word. The invention is useful in other known arrangements using two "cores" per bit, and also in known arrangements using one core per bit.

Figure 3:
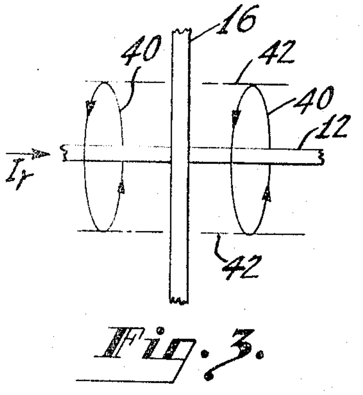
FIGURES 3, 4 and 5 are current-flux diagrams which will be referred to in describing the operation of the memory of FIGURES 1 and 2.
Figure 4:
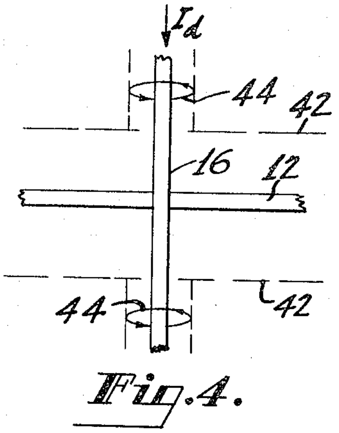
Figure 5:
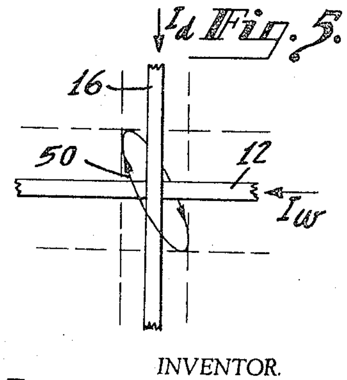

Reference will now be made to FIGURES 3, 4 and 5 for a description of the operation of one memory element such as the element at the crossover of the word line 12 and the digit-sense line 16 in FIGURE 1. The first word driver 20 supplies to the word line 12 a read pulse *r* which is represented in FIGURE 3 by the current $I_r$ having the indicated direction (polarity). The read current $I_r$ causes a saturation flux around the word line having the direction indicated by the arrowed circles 40 and an extent indicated by the dashed lines 42. The magnetic material in the indicated volume remains saturated after the read pulse *r* is terminated.

FIGURE 4 illustrates the subsequent application of a current pulse $I_d$ from the "1" digit driver 24 to the digit-sense line 16. The digit pulse $I_d$ may be one-tenth or one-twentieth as large as the read pulse $I_r$. The relative amplitude of the digit pulse is determined by making a compromise between the desire for a large output sense signal and a desire to avoid disturbing stored information at non-addressed locations. The digit pulse $I_d$ causes a residual saturation flux 44 around the parts of the digit-sense line 16 removed from the already saturated region 42 around the word line 12. Since the region around the word line 12 was already saturated, the relatively low-amplitude digit current pulse $I_d$ cannot affect the flux in the memory element region immediately surrounding the crossover of the lines 12 and 16. Therefore, a digit pulse in a digit-sense line does not disturb the magnetic state of a memory element at a crossover of an unenergized word line. This is important because the digit pulse $I_r$ is applied not only to the memory element along the word line 12, but also to corresponding memory elements along the other word lines 13 and 14.

FIGURE 5 illustrates a flux 50 resulting from the concurrent application of a digit pulse $I_d$ to the digit-sense line 16 and a write pulse $I_w$ to the word line 12. The write pulse $I_w$ has the opposite direction (polarity) compared with the read pulse $I_r$ of FIGURE 3, and may be about 75 percent as large in amplitude. While the digit pulse $I_d$ is too small by itself to affect the already saturated flux at the crossover (the magnetizing force does not extend beyond the knee of the hysteresis loop), it is effective to influence the resultant angular direction of the flux due to the write pulse $I_w$. To summarize, the amplitude of the digit pulse $I_d$ is too small to significantly affect the already saturated flux at a crossover due to a read pulse $I_r$, but the amplitude of the digit pulse $I_d$ is large enough to significantly influence the resultant angular direction of flux at a crossover due to a concurrent write pulse $I_w$. The vector resultant of the two currents $I_d$ and $I_w$ causes a residual flux to be established in the loop 50 which links both lines 12 and 16.

The flux 50, shown in FIGURE 5, represents the storage of a "1" information bit in a one-core-per-bit system. In a two-core-per-bit system, the FIGURE 5 flux at the crossover 12, 16 and the FIGURE 3 flux at crossover 12, 17 represents the storage of a "1"; and the storage of a "0" is represented by the FIGURE 3 flux at crossover 12, 16 and the FIGURE 5 flux at crossover 12, 17.

To read out the "1" information bit represented by the residual flux 50 in FIGURE 5, a read pulse $I_r$ (FIGURE 3) is applied to the word line 12. The read pulse $I_r$ is of sufficient amplitude (relative to the applicable hysteresis loop) to cause the flux 50 of FIGURE 5 to switch to the direction of the flux 40 in FIGURE 3. When the flux 50 switches, it must of necessity cut the digit-sense line 16 and induce a sense signal voltage therein. The sense signal is coupled by the digit-sense line 16 to one input of the differential sense amplifier 30. No corresponding sense signal is induced on the digit-sense line 17 coupled to the other input of the sense amplifier. A difference signal having a polarity representing the sored "1" appears at the output labeled $2^n$. If a "0" had been stored, an opposite polarity output signal would have been provided at the $2^n$ output. The other bit of the word stored along word line 12 is similarly and simultaneously provided at the output $2^{n+1}$ of the differential sense amplifier 34.

When the invention is incorporated in a one-core-per-bit memory system, each digit-sense line is coupled to a respective digit driver operative for the storage of a "1" and not operated for the storage of a "0"; and is coupled to an individual sense amplifier. Alternatively, a one-core-per-bit system may be used wherein each digit driver supplies a digit pulse of one direction (polarity) when writing a "1" and the opposite direction (polarity) when writing a "0." Then the storage of a "1" results in a flux 50 in the second and fourth quadrants as shown in FIGURE 5; and the storage of a "0" results in a flux in the first and third quadrants. This provides a bipolar sense signal having one polarity corresponding to a "1" and the opposite polarity corresponding to a "0."

A one-core-per-bit memory such as described above is relatively easy to construct in small dimensions by automated techniques because the crossover of only two orthogonally related lines imbedded in the ferrite sheet form or define a memory element. A separate registered diagonal sense line is not needed. A single digit-sense line serves for both digiting and sensing.

One memory constructed according to the invention had sixteen word locations each having sixteen memory elements. A read-write operation cycle time of one hundred nanoseconds (10 megacycles) was feasible. The read pulse $I_r$ was about 200 milliamperes, the write pulse was about 130 milliamperes, the digit pulse was about 15 milliamperes and the sense voltage was about ±15 millivolts.

What is claimed is:

1. A memory comprising
a ferrite magnetic sheet having a plurality of parallel word lines imbedded therein in a first plane and having a plurality of parallel digit-sense lines imbedded at right angles to said word lines in a second, closely spaced plane,
word driver means to apply sequential read and write pulses of opposite polarities to any selected one of said word lines, said word driver means being constructed to generate read and write pulses having a sufficiently high amplitude to cause a region of flux saturation coaxially encircling the selected word line and extending out therefrom beyond the digit-sense lines, and
digit driver means to apply digit pulses simultaneously with said write pulse to said digit-sense lines in accordance with digits of a word to be stored in the memory, said digit driver means being constructed to generate pulses of insufficient amplitude to cause a significant change in the amount of already-saturated flux at a crossover of a digit line and a word line, said digit pulse being present and operative to cause a rotation of the write pulse flux to a resultant diagonal angular direction when the flux is switched to saturation in the region of a crossover of a digit line and a word line energized by a write pulse, whereby a subsequently applied read pulse on said selected word line causes a rotation of the diagonally-directed flux to a direction coaxial with the word line and the consequent inducing of sensed information signals on said digit-sense lines.

2. A memory comprising
a ferrite magnetic sheet having a plurality of parallel word lines imbedded therein in a first plane and having a plurality of parallel digit-sense lines imbedded at right angles to said word lines in a second, closely spaced plane,
word driver means to apply sequential read and write pulses of opposite polarities to any selected one of said word lines, said word driver means being constructed to generate read and write pulses having a sufficiently high amplitude to cause a region of flux saturation coaxially encircling the selected word line and extending out therefrom beyond the digit-sense lines,
digit driver means to apply digit pulses concurrently with said write pulse to said digit-sense lines in accordance with digits of a word to be stored in the memory, said digit driver means being constructed to generate pulses of insufficient amplitude to cause a significant change in the amount of already-saturated flux at a crossover of a digit line and a word line, said digit pulses being present and operative to cause a rotation of the write pulse flux to a resultant diagonal angular direction when the flux is switched to saturation in the region of a crossover of a digit line and a word line energized by a write pulse, and
sense amplifiers coupled to said digit-sense lines to detect sense signals induced on the digit-sense lines when a subsequently applied read pulse on said selected word line causes a rotation of diagonally-directed flux to a direction coaxial with the word line.

3. A memory comprising
a ferrite magnetic sheet having a plurality of parallel word lines imbedded therein in a first plane and having a plurality of parallel digit-sense lines angularly related to said word lines and imbedded in a second, closely spaced plane, word driver means to apply sequential read and write pulses of opposite polarities to any selected one of said word lines, said word driver means being constructed to generate read and write pulses having a sufficiently high amplitude to cause a region of flux saturation coaxially encircling the selected word line and extending out therefrom beyond the digit-sense lines, and digit driver means to apply digit pulses concurrently with said write pulse to those of said digit-sense lines corresponding with "1" digits of a word to be stored in the memory, said digit driver means being constructed to generate pulses of insufficient amplitude to cause a significant change in the amount of already-saturated flux at a crossover of a digit line and a word line, but being present and operative to cause a rotation of the write pulse flux to a resultant diagonal angular direction when the flux is switched to saturation in the region of a crossover of a digit line and a word line energized by a write pulse, whereby a subsequently applied read pulse on said selected word line causes a rotation of the diagonally-directed flux to a direction coaxial with the word line and the consequent inducing of sense signals on those of said digit-sense lines corresponding with digit positions that were storing a "1."

4. A memory comprising a ferrite magnetic sheet having a plurality of parallel word lines imbedded therein in a first plane and having a plurality of parallel digit-sense lines each imbedded at an angle to said word lines in a second, closely spaced plane, word driver means to apply sequential read and write pulses of opposite polarities to any selected one of said word lines, said word driver means being constructed to generate read and write pulses having a sufficiently high amplitude to cause a region of flux saturation coaxially encircling the selected word line and extending out therefrom beyond the digit-sense lines, digit driver means to apply digit pulses concurrently with said write pulse to each of said digit-sense lines, said digit driver means being constructed to generate a digit pulse having one polarity to write a "1" and the other polarity to write a "0," to cause a resultant angular direction of the flux at the word-digit crossover in one or the other of the two generally diagonal directions determined by the polarity of the digit pulse, said digit pulses being of insufficient amplitude to cause a significant change in the amount of already-saturated flux at a crossover of a digit line and a word line, but being present and operative to cause a rotation of the write pulse flux to resultant diagonal angular direction when the flux is switched to saturation in the region of a crossover of a digit line and a word line energized by a write pulse, whereby a subsequently applied read pulse on said selected word line causes a rotation of the diagonally-directed flux to a direction coaxial with the word line and the consequent inducing on said digit-sense lines of sense signals having polarities corresponding with stored "1" and "0" digits, and a sense amplifier means coupled to each digit-sense line to sense the polarity of said sense signal induced on the respective digit-sense line.

References Cited by the Examiner

UNITED STATES PATENTS

| | | | |
|---|---|---|---|
| 3,040,301 | 6/1962 | Howatt | 340—174 |
| 3,112,470 | 11/1963 | Barrett | 340—174 |
| 3,181,131 | 4/1965 | Pryor | 340—174 |

BERNARD KONICK, *Primary Examiner.*

TERRELL W. FEARS, *Assistant Examiner.*